United States Patent [19]

Blackmore

[11] 4,334,142
[45] * Jun. 8, 1982

[54] SKIN EFFECT PIPE HEATING SYSTEM UTILIZING CONVECTIVE AND CONDUCTIVE HEAT TRANSFER

[76] Inventor: Douglas Blackmore, 57 Hillcrest Dr., Upper Saddle River, N.J. 07458

[*] Notice: The portion of the term of this patent subsequent to Jul. 21, 1998, has been disclaimed.

[21] Appl. No.: 179,719

[22] Filed: Aug. 20, 1980

Related U.S. Application Data

[63] Continuation-in-part of Ser. No. 1,044, Jan. 4, 1979, Pat. No. 4,280,045, which is a continuation-in-part of Ser. No. 744,437, May 6, 1977, abandoned.

[51] Int. Cl.³ .......................... H05B 3/00; F16L 53/00
[52] U.S. Cl. ..................................... 219/301; 137/341; 138/33; 219/10.49 R; 219/300; 219/535
[58] Field of Search ................ 219/300, 301, 10.49 R, 219/10.51, 535, 544; 137/341; 138/33

[56] References Cited

U.S. PATENT DOCUMENTS 3,617,699 11/1971 Othmer ............................... 219/300
3,706,872 12/1972 Trabilcy ........................... 219/301 X
4,280,045 7/1981 Blackmore .......................... 219/301

FOREIGN PATENT DOCUMENTS 46-19345 5/1971 Japan ................................. 219/301

Primary Examiner—A. Bartis
Attorney, Agent, or Firm—Darby & Darby

[57] ABSTRACT

Faster and more efficient heat transmission between an electrical skin effect current heat generating unit and the surface of a pipe to be heated is achieved by utilizing convective as well as conductive transfer of heat therebetween. The unit includes an elongated ferromagnetic channel having an open face and secured along its longitudinal edges by staggered stitch welds to the surface of a ferromagnetic pipe to be heated. The inner surface of the channel and the confronting outer surface of the pipe define an air space at least partially surrounding a freely movable insulated conductor having one end connected to a pole of an AC source and its other end connected to the far end of the channel. The near end of the channel is connected to the other pole of the AC source. The stitch weld are arranged to provide staggered slits along the length of the channel between the edges thereof and the pipe surface enabling substantial transverse air flow freely therethrough across the conductor and confronting channel and pipe surfaces with resultant convective as well as conductive transfer of heat to the pipe. The channel and pipe can be surrounded by thermal insulation applied in such a manner as to form an open space for circulation of convective heat.

4 Claims, 7 Drawing Figures

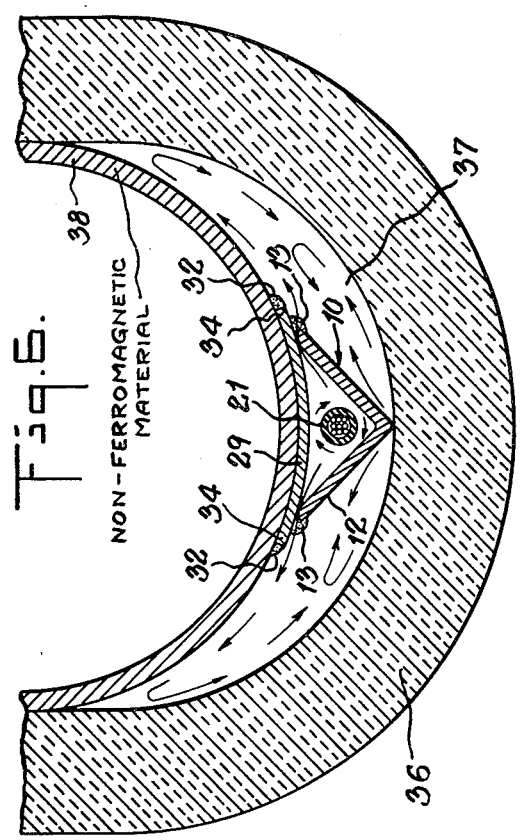
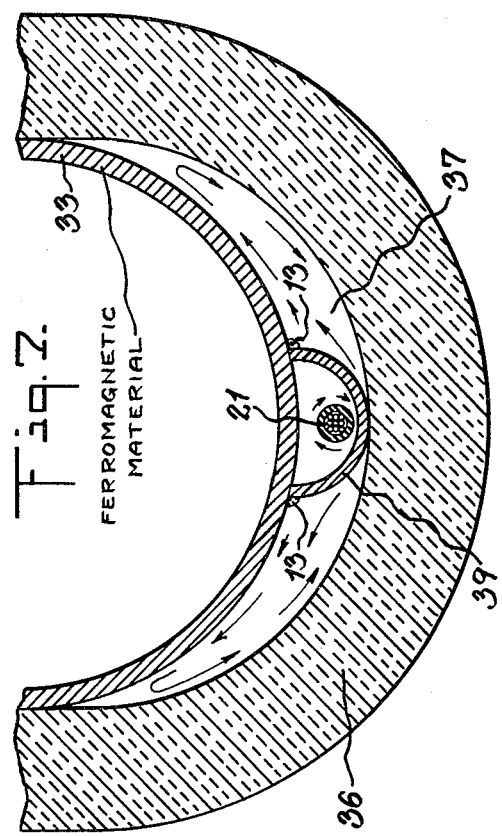
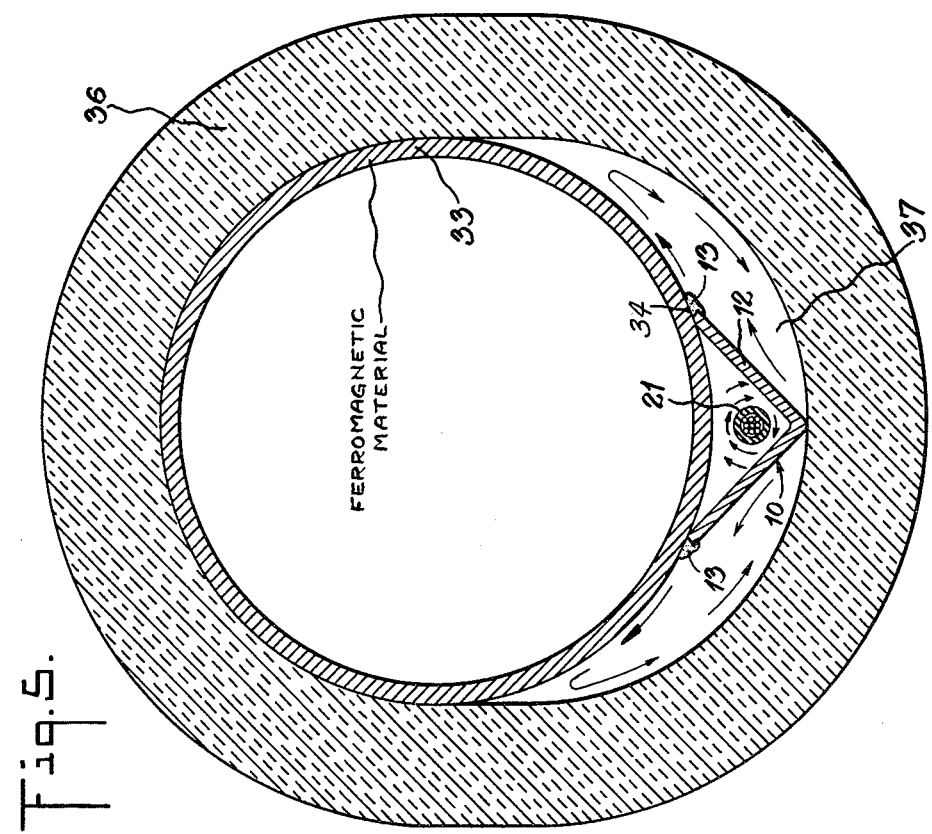

SKIN EFFECT PIPE HEATING SYSTEM UTILIZING CONVECTIVE AND CONDUCTIVE HEAT TRANSFER

This application is a Continuation-in-Part of my copending patent application Ser. No. 1,044 filed Jan. 4, 1979, now U.S. Pat. No. 4,280,045, granted July 21, 1981, which was a Continuation-in-Part of my patent application Ser. No. 744,437 filed May 6, 1977, now abandoned.

The present invention relates to electrical heating systems of the skin effect current type and, more particularly, to an improved heat generating system utilizing not only conduction but also convection in a two-part cross-sectional structure that is independent of the means being heated.

DESCRIPTION OF PRIOR ART

The use of an alternating current generated power source for heating pipe lines conveying viscous fluids are well known, as seen in U.S. Pat. No. 2,802,520, wherein the heater element consisted of a coaxial arrangement of an insulated copper conductor and a copper pipe with one end of the conductor connected to one terminal of its alternating current source, the other end of the conductor connected to a far end of the copper pipe and the near end of the copper pipe connected to the other terminal of the alternating current power source. The heat generated by the heater was of a lower wattage output because of the lower resistivity of the copper pipe, as against the higher resistivity of a steel pipe.

In U.S. Pat. No. 3,293,407, the importance of using a highly resistive ferromagnetic pipe as the outer sheath of a coaxial arrangement with an electrically insulated copper conductor was taught for use in heating large diameter pipe lines through the skin effect procedure, both arcuate surface being joined by single line contact, that is, at their point of tangency. It was recognized from the teachings of U.S. Pat. No. 3,293,407 that a number of small diameter heat tubes would be required to heat large diameter pipe lines in order to take the fullest advantage of skin effect heating. In Japanese Pat. No. 629,819, registered Jan. 5, 1972 (No. S46-19345, published May 31, 1971) the same inventor, Masao Ando, of U.S. Pat. No. 3,293,407, taught the use of a larger area of contact between the heat tube and the pipe line, thereby facilitating greater transfer of heat to the pipe line.

In U.S. Pat. No. 3,617,699 it is taught that by the use of a structural form other than a tube, such as a semi-round shaped element having its longitudinal edges continuously welded to the pipe line would function as a skin effect heating member with higher wattage output per foot, thereby reducing the number of heat tubes heretofore required. Another teaching employing the skin effect of alternating current is described in U.S. Pat. No. 3,706,872 wherein staggered stitch welding in lieu of continuous welding is employed for reducing the installation cost of that in U.S. Pat. No. 3,617,699. In both U.S. Pat. No. 3,617,699 and U.S. Pat. No. 3,706,872 patents a portion of the wall of the pipe being heated is utilized in conjunction with the semi-round structure of U.S. Pat. No. 3,617,699 and angular structure of U.S. Pat. No. 3,706,872 for the return leg of the alternating current. This is necessary in order to create the magnetic field necessary for skin effect heating. And in U.S. Pat. No. 3,718,804 the above prior art is reviewed indicating the fear of dielectric breakdown in such installations with resultant arcing and blow-through in the portion of the pipe wall being used as part of the return leg of the alternating current.

Skin effect heating elements that are currently in use are mostly of the tubular type which provide minimal contact with the surface to be heated, as is evident in U.S. Pat. No. 3,293,407 and in a brochure entitled "Electric Heating System for Pipelines", page 4, published by Pipe Heating Systems, Inc. of Brecksville, Ohio, and as indicated on page 5 of said brochure, the major portion of the heating element is encapsulated within the thermal insulation of the pipeline. Furthermore, the annular space within the tubular element forms a dead air space that also retards the flow of heat from the tubular element to the surface being heated. Publications illustrating insulation systems for large pipes and the like are described in a brochure entitled "Insulation Systems, Metal-On", distributed by Johns-Mansville, Ken-Caryl Ranch, Denver, Colorado and in a brochure entitled "Poly-Therm Piping System" distributed by Perma-Pipe, a Division of Midwesco, Inc. of Niles, Illinois. Both brochures disclose several means of heat tracing and in the majority of cases the tracers are shown on the top side of the pipe being heated where the heat loss is greatest.

SUMMARY OF THE INVENTION

Accordingly, an object of the present invention is to provide an improved electrical heat generating system based upon the skin effect of alternating current wherein the generated heat energy is more efficiently applied to the element being heated.

A further object of the invention is to provide a skin effect heat generating system wherein air is freely circulated into and out of the tubular heating element for increased and faster transmission of heat energy.

A still further object of the invention is to provide a skin effect heat generating system wherein both conduction and convection from the tubular heating element are utilized in transferring heat energy to the surface being heated.

Other and further objects will be obvious upon an understanding of the illustrative embodiments about to be described, or will be indicated in the appended claims, and various advantages not referred to herein will occur to one skilled in the art upon employment of the invention in practice.

In accordance with the present invention, the foregoing objects are generally accomplished by providing along a surface to be heated a substantially closed ferromagnetic structure in cross-section, with an insulated electrical conductor therein connected at a near end to an alternating current lead and at the far end of the conductor connected to a far end of the structure and a near end of the structure connected to another lead of alternating current for completion of an electrical circuit. The structure includes openings therealong proximate to the surface to be heated, which forms part of the structure. The electrical current is confined within the inner surface portion of the structure and produces heat therein which is conducted to the surface, but is also provided to the surface by convection occasioned by air flow through the openings.

In the preferred embodiment there is a two-part structure which may comprise a portion of a pipe being heated attached to longitudinal edges of an angular or channel element by staggered stitch or tack welds so as to provide openings between the welds to enable heat energy currents of air to freely circulate throughout the interior of the two-part heating structure in a multidirectional manner. In the prior art the heated air is trapped within the tubular structure. Thus, when the angular or channel element of applicant's structure is welded to the part to be heated, such as a large pipe, heat energy is transferred by conduction from the plate to the pipe and additional heat energy is transferred by convection via the heated air from the interior of the two-part structure to the pipe. There is therefore an increased wattage input to the pipe being heated, which wattage increase reduces substantially the number of heating elements that are normally required. For example, a system requiring 50 watts per lineal foot input can be accomplished with one tracer element of this invention whereas three or more tubular trace elements of the prior art are needed to obtain this wattage input. The teachings of U.S. Pat. No. 3,617,699 recognizes the limitations of the existing tubular heating systems wherein it states the output to be no more than 10–15 watts per lineal foot (col. 1, lines 35-38). Accordingly, it is seen that applicant's invention substantially reduces the installation cost by requiring only one tracer as against three tracers of the prior art.

BRIEF DESCRIPTION OF THE DRAWINGS

A preferred embodiment of the invention has been chosen for purposes of illustration and description and is shown in the accompanying drawings, forming a part of the specification, wherein:

FIG. 5 is an enlarged sectional view of the triangular structure of FIG. 3 in which part of the structure is formed by the bottom surface of the peripheral section of a large fluid conveying pipe of ferromagnetic material with insulation added thereover, in which arrows indicate flow of heat energy around the conductor and between the thermal insulation and the pipe after emanating from the triangular structure.

FIG. 6 is an enlarged sectional view similar to FIG. 5, in which the pipe is of non-ferromagnetic material and the structure of copending application Ser. No. 1,044 is utilized.

FIG. 7 is an enlarged sectional view similar to FIG. 5, in which the channel element is of arcuate shape and a portion of the pipe provides part of the heating structure.

DESCRIPTION OF THE PREFERRED EMBODIMENT

Figure 1:
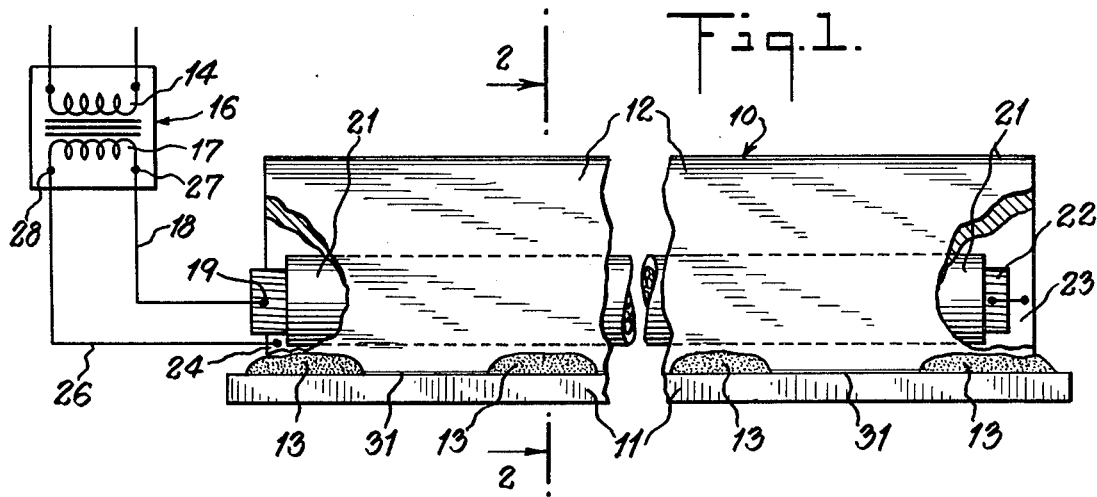
FIG. 1 is a partially schematic, partially sectioned, front elevational view in accordance with the present invention showing a substantially two-part triangular structure consisting of an elongated base, corresponding to a portion of the surface being heated, in cross-section partially stitch welded to longitudinal edges of an angular element.

Referring now to the drawings in detail, particularly to FIGS. 1 and 2, there is shown a skin effect heat generating unit 10 having a base plate 11 and an angular element 12 secured to the base plate 11 along its longitudinal edges by welds 13, which may be stitch or tack welds in staggered form, as will be indicated hereinafter. It is to be noted that the base plate 11 extends transversely beyond the sides of the angular element 12 and is part of a surface being heated. It should also be appreciated that, when a pipe made of a ferromagnetic material is used, the base plate 11 would actually be a portion of the pipe wall. As seen in FIG. 1, alternating current is supplied to a primary winding 14 of a transformer 16 and from a secondary winding 17 of this transformer 16 one lead 18 is connected to a near end 19 of an insulated conductor 21. At the far end 22 of the conductor 21 a connection is made to a far end 23 of the angular element 12 and at a near end 24 of the angular element 12 a connection is made to another lead 26 of the secondary winding 17.

Electrical heat generating units employing skin effect current are well known, as indicated in the patents mentioned hereinbefore. Accordingly, it is readily evident in the present invention that alternating current may be traced from one terminal 27 of the secondary winding 17 of transformer 16 along lead 18 and insulated conductor 21 to its far end connection 22 with the angular element 12 and 23 and back via angular element 12 to its near end connection 24 with lead 26 and thence to the other terminal 28 of secondary winding 17. The current flowing along conductor 21 produces a magnetic field around the conductor, as indicated by the arrows in FIG. 5, and this magnetic field produces heat in the elongate, hollow generating unit 10. As in the prior art, the current is confined within the inner surface portion of the generating unit 10, thereby providing a heat generating unit free of electrical current on the outer surface portion thereof.

Figure 2:
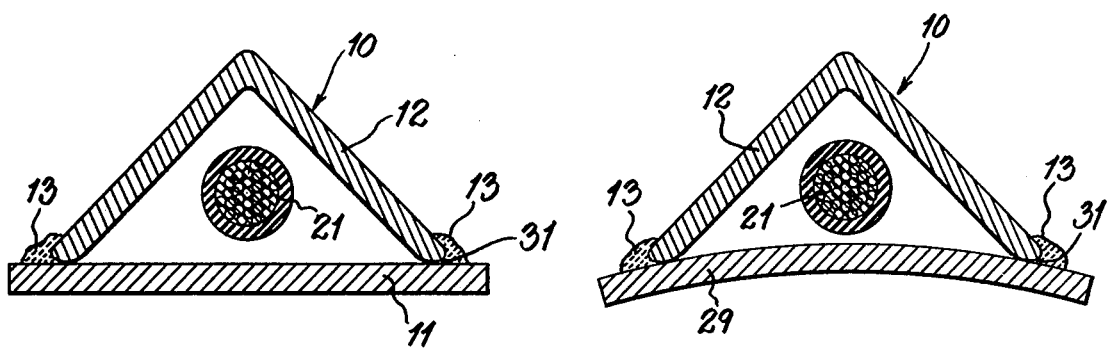
FIG. 2 is a sectional view taken along the line 2—2 of FIG. 1 showing one embodiment of the triangular structure in which the base plate is rectilinear (i.e., a flat surface being heated).
Figure 3:
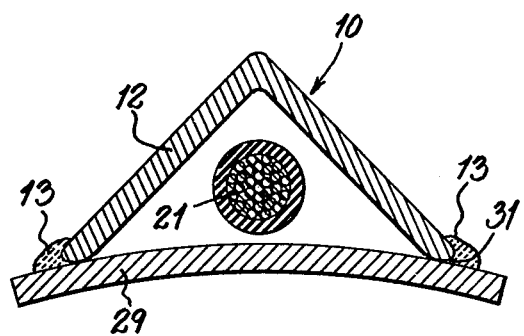
FIG. 3 is a sectional view similar to FIG. 2 showing another embodiment of the triangular structure in which the base plate is arcuate, such as a portion of a surface of a pipe being heated.

FIG. 3 is similar to FIG. 2 except that the base plate 29 is arcuate in shape to represent a curved contiguous surface to be heated, such as a large diameter pipe. Here again the base plate 29 is extended transversely beyond the sides of the angular element.

Figure 4:
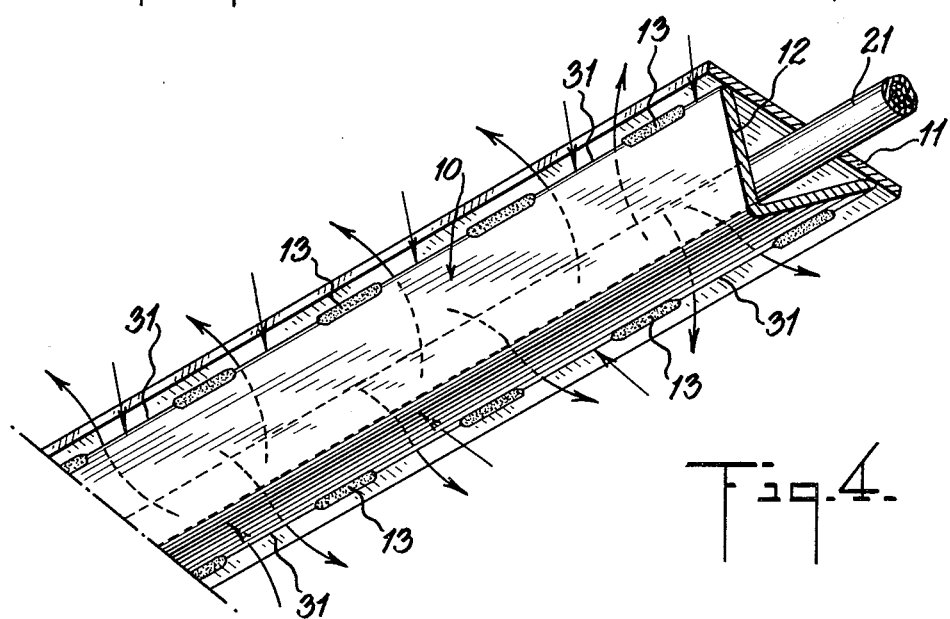
FIG. 4 is a perspective view of that shown in FIG. 1 showing the stitch welds in staggered arrangement and arrows indicating flow of heat energy currents over internal and external surfaces of the heat generating unit between stitch welds.

In FIG. 4 the essence of applicant's invention is brought out more clearly, particularly the increase of heat energy through the use of convection heat currents. In this view, which is an exploded and extended view of that shown in FIG. 2, a plurality of spaced staggered slits 31 or narrow openings, that is, gaps between the lower edges of the angular element 12 and the plate 11, are provided along the length of the heat generating unit 10. Since the spaced welds 13 are staggered, so also are the slits staggered. In the prior art structures the tubular heating elements have a dead air space surrounding the conductor and this dead air space reduces heat transfer, thereby acting as a thermal insulation barrier. As shown by the direction of the arrows in FIG. 4, the heated air within the generating unit 10 is no longer entrapped and is now enabled by convection to pass the exterior of the generating unit. It is seen that incoming air at one side of slit 31 encircles the conductor 21 and then passes out the other staggered slit is heated air to cummulatively add to the heating effect along the pipe being heated.

In FIG. 5 there is shown a heat generating unit on the lower portion of a fluid carrying pipe 33 of ferromagnetic material. Surrounding the heat generating unit is shown conventional thermal insulation 36, which it is to be noted has been applied in such manner as to provide an open space 37 for more ready circulation of the convectional heat energy currents as indicated by the arrows. FIG. 6 is similar to FIG. 5 except that the fluid carrying pipe 38 is of non-magnetic material, necessitating the use of a mounting plate 29 having flanges 34 welded to pipe 38 at 32 intermediate the edges of angular element 12 and pipe 38 and to which the edges are secured by staggered stitch welds 13 as taught in my copending application serial number 1,044. FIG. 7 is also similar to FIG. 5 except that the element 39 is arcuate instead of angular, but it is welded directly to the pipe, which is made of ferromagnetic material.

From the foregoing description it will be seen that the invention expands the use of skin effect heating beyond the teachings of the patents referred to hereinbefore in that:

(a) the heating structure can be readily and economically secured directly to a pipe line by acceptable banding procedures or tack welded in position with unskilled help; and (b) it provides increased heat transfer by utilizing heated air within the heat generating unit to convectionally heat the pipe and in addition to utilize the heated air within the open space 37 between the insulation and pipe and thereby increase the heat application to the exposed surfaces of the pipe wall within the pipe lines insulated covering.

As various changes may be made in the the form, construction and arrangement of the parts herein, without departing from the spirit and scope of the invention and without sacrificing any of its advantages, it is to be understood that all matters are to be interpreted as illustrative and not in any limiting sense.

What is claimed is:

1. A heat generating system for mounting on the wall of a pipe, said system having a heat generator structure utilizing skin effect alternating current and including a ferromagnetic, elongate hollow element and an insulated conductor freely movable for expansion within said hollow element, the inner surfaces of said element defining an air space at least partially surrounding said conductor, said conductor being connected at one end to one pole of a source of alternating current, the other end of the conductor being connected to a far end of said hollow element, and a near end of the hollow element being connected to another pole of the alternating current source, said hollow element comprising two parts with one part defining an elongated open face channel having two elongated, coextensive, spaced longitudinal edges, the other part being the portion of the wall of said pipe confronting said one part and bounded by said longitudinal edges, means securing said other part in spaced relationship to said longitudinal edges so as to provide openings between said other part and said longitudinal edges of said one part along the length of said hollow element for enabling substantial transverse air flow freely therethrough across said conductor and internal surfaces of said hollow element with resultant convection heating air flow of said generated heat, and said two parts being of such thickness that said alternating current is confined along the inner surface portion of said hollow element when said conductor and hollow element are energized by said source.

2. A heat generating system according to claim 1, wherein said securing means comprises staggered stitch welds and said openings between said stitch welds are slits between the longitudinal edges of said one part and surface of said other part.

3. A heat generating system according to claims 1 or 2, wherein said one part is an angular member.

4. A heat generating system according to claims 1 or 2, wherein said one part is an arcuate member.

* * * * *